United States Patent [19]
Gunter

[11] 3,986,305
[45] Oct. 19, 1976

[54] METHOD OF GRINDING OF GEAR TEETH

[75] Inventor: Erwin J. Gunter, Widen, Switzerland

[73] Assignee: Maag Gear-Wheel & Machine Company Limited, Switzerland

[22] Filed: May 8, 1975

[21] Appl. No.: 575,629

Related U.S. Application Data

[62] Division of Ser. No. 395,129, Sept. 7, 1973, Pat. No. 3,906,677.

[30] Foreign Application Priority Data
Sept. 7, 1972 Switzerland.................... 13131/72

[52] U.S. Cl. ............................................. 51/287
[51] Int. Cl.² ........................................ B24B 1/00
[58] Field of Search.............. 51/287, 165.71, 123 G

[56] References Cited
UNITED STATES PATENTS

| | | | |
|---|---|---|---|
| 2,316,490 | 4/1943 | Semar.............................. | 51/287 X |
| 3,044,221 | 7/1962 | Graf................................. | 51/123 G |
| 3,691,357 | 9/1972 | McIntosh......................... | 51/165.71 |
| 3,694,970 | 10/1972 | Schoonover..................... | 51/165.71 |

*Primary Examiner*—Harold D. Whitehead
*Attorney, Agent, or Firm*—Toren, McGeady and Stanger

[57] ABSTRACT

For grinding the flanks of gear teeth to modify an involute tooth profile determined by the generating method of grinding, the tooth flank area is associated with a system of co-ordinates and a grinding programme is employed that specifies involute modifying grinding feed in terms of the co-ordinates. By comparison of actual and programmed feed positions at instantaneous points in the co-ordinate system, feed corrections are applied at those points to obtain the programmed profile. By interpolation between successive comparison points, incremental feed corrections are obtained to give a smoother change of profile.

3 Claims, 4 Drawing Figures

METHOD OF GRINDING OF GEAR TEETH

CROSS-REFERENCE TO PRIOR APPLICATION

This is a division of Ser. No. 395,129 filed Sept. 7, 1973, now U.S. Pat. No. 3,906,677, dated Sept. 23, 1975.

BACKGROUND OF THE INVENTION

The invention relates to the grinding of the flanks of gear teeth, more particularly, but not exclusively, on cylindrical gearwheels, by means of at least one grinding wheel, in which feed motions between the workpiece and the grinding wheel are superimposed upon a normal generating motion between the workpiece and the grinding wheel and in a direction transverse to the surface or flank of a tooth being ground in order to vary the theoretical involute form of the tooth flanks in zones radially along the tooth profile and/or axially along the tooth length.

It is common practice to utilise for gear-tooth grinding the so-called zero-degrees method in which two grinding wheels basically include an angle of 0°, that is to say they are disposed more or less parallel to each other. In therory there is point contact between the grinding wheel and the workpiece but in order to accentuate somewhat such point contact it is also possible for the grinding wheel axes to be inclined relative to each other by a few degrees. To this end it is important that the contact occurs at the external edge of the grinding wheel and the generating motion between the grinding wheel and the workpiece is related to the base circle of the gear being ground, the two theoretically active grinding points being disposed on a tangent to the base circle.

Using this basic generating method, axial motion of the grinding wheel or wheels can be controlled, for example, by a known arrangement of profile and longitudinal correcting template which act on a double lever system (U.S. Pat. No. 3,044,221). Such axial movements of the grinding wheel give profile correction (generally in the form of a tooth tip and/or tooth root reduction) of the tooth uniformly over the entire length of the tooth. The aforementioned specification also describes how the profile can be modified at different axial zones to give a reduction of thickness at the ends of the teeth. An oval contact pattern therefore obtains in contact with the tooth flanks of a mating wheel when such gearwheels are paired.

The previously known methods for modifying gear tooth flank profiles can be inadequate in certain instances, as for example in gear wheels for power transmissions that operate under maximum loadings with extreme tooth pressures and/or circumferential velocities, and also in rolling wheels, that is to say gear tools for the finish rolling of gearwheels. Such applications may require helix corrections or other tooth flank corrections in which the tooth profile varies continuously along the tooth width.

SUMMARY OF THE INVENTION

According to the present invention, there is provided a method of grinding the flanks of gear teeth on a workpiece by means of at least one grinding wheel wherein a generating motion between the workpiece and said wheel adapted to give the gear teeth involute profile is modified by the superimposition of relative feed displacements between said workpiece and wheel in a direction transverse to the flank of a gear tooth being ground, the area of said flank being related to a system of co-ordinates and a program for relative feed positions between said workpiece and wheel giving said modified profile being stored in terms of said co-ordinates, said programme being employed to provide feed motions for said modification of the gear tooth involute profile.

Preferably the instantaneous relative feed position of said grinding wheel and the workpiece is interrogated at predetermined points in the travel of the wheel relative to the tooth flank and said modifying feed motions are applied at said points by comparison of the measured and programmed feed position values. The interrogation may employ position transducers which may be absolute or incremental transducers.

Apparatus for performing to method of the invention may comprise position transducers responsive to relative movement between the workpiece and said grinding wheel in the grinding operation to provide a measure of the relative feed positions between said grinding wheel and tooth flank, a program control unit receiving an input from said transducers and having means for comparison of said input with a feed position program, and an output providing correcting displacements for said relative feed positions in accordance with the predetermined program to modify the gear tooth involute profile.

Using the method of the invention it is not necessary to employ a medium such as a perforated strip or the like for individual operations. The co-ordinate network may be selected as required independently in both directions either with a narrow or a wide mesh and it is possible to arrange that all values fed into the system can be quickly changed.

BRIEF DESCRIPTION OF THE DRAWINGS

By way of example, one embodiment of the invention will be more particularly described with reference to the accompanying drawings wherein.

DESCRIPTION OF THE PREFERRED EMBODIMENT

Figure 1:
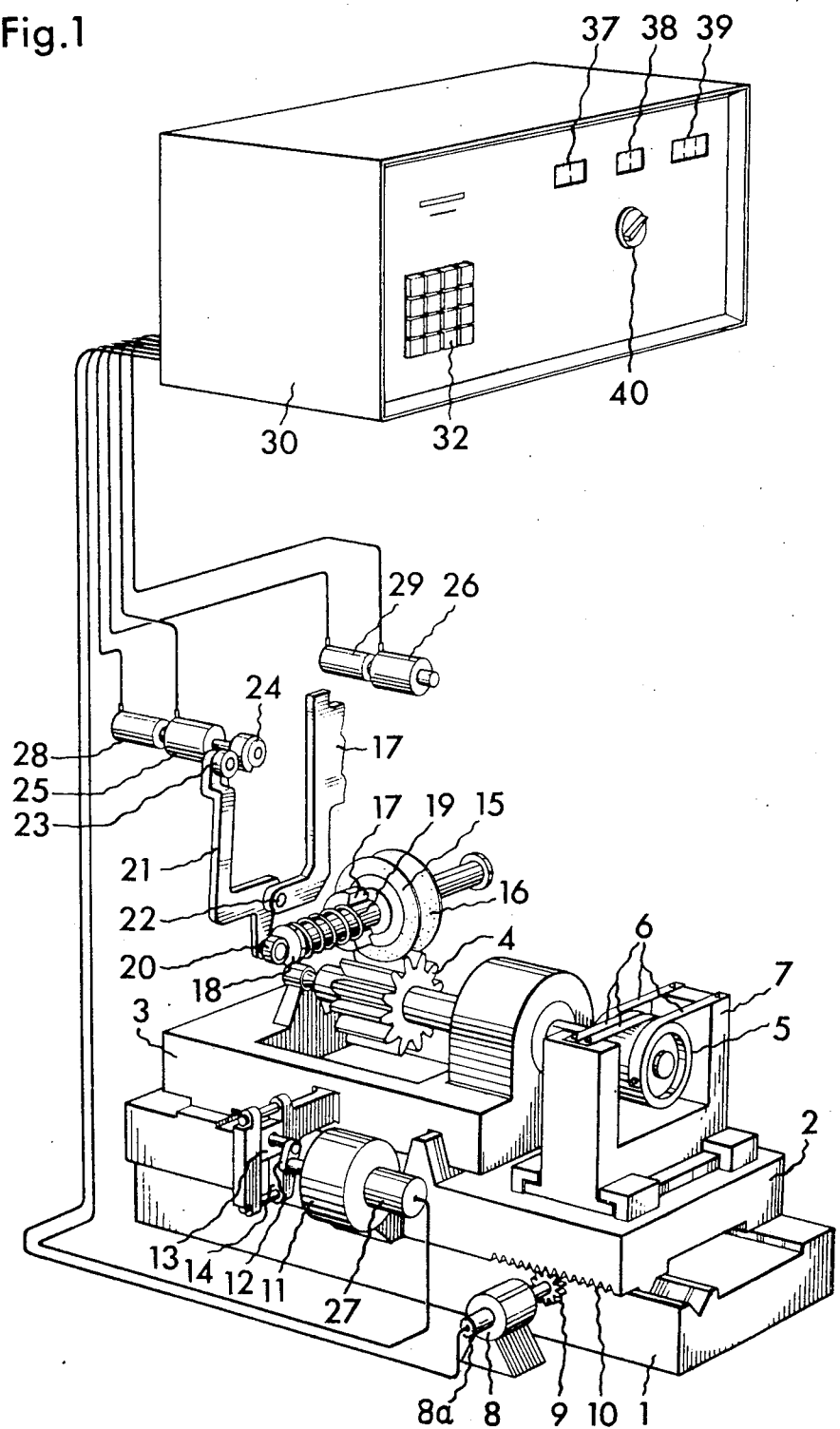
FIG. 1 illustrates a tooth flank grinding machine for spur gears, provided with means (shown in respect of one only of the two grinding wheels) for modification of the profile of a tooth flank being ground.
Figure 2:
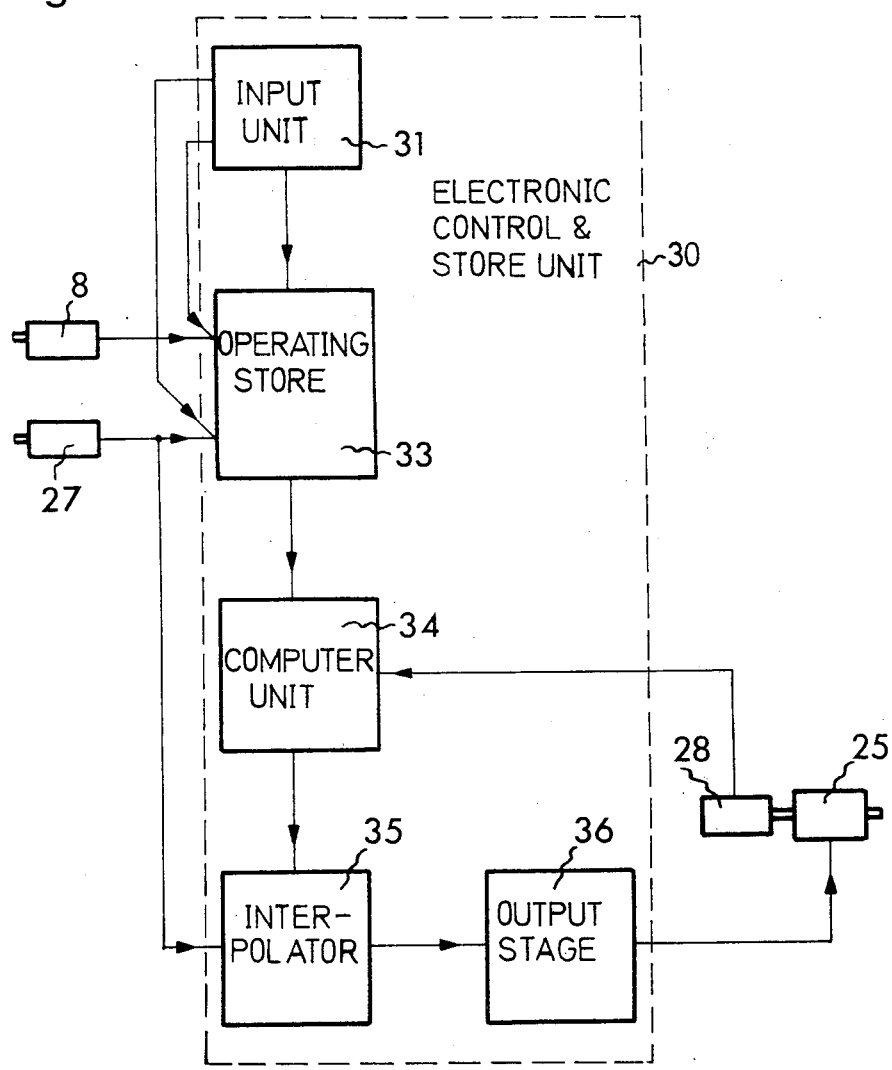
FIG. 2 is a block circuit diagram of the electronic store and control apparatus of said profile modifying means.

In the grinding machine shown in FIG. 1, a bed 1 has slidably mounted on it a carriage 2 for generating motion longitudinally of the gear teeth of a workpiece, shown as a spur gear 4 supported on a cross-carriage 3. The cross-carriage 3 is slidably mounted on the carriage 2 to be displaceable transversely of the workpiece axis. The workpiece is itself rotatably mounted on the cross-carriage and a pitch block 5 non-rotatably fixed to the workpiece is connected by opposed pairs of tension tapes 6 to a pitch block stand 7 clamped on the carriage 2. The sliding displacement of the cross-carriage 3 on the carriage 2 thus causes the pitch block 5 and the workpiece 4 to rotate, so producing the gear generating motion of the workpiece. The non-rotatable connection of the pitch block to the workpiece can be released for re-indexing when one pair of tooth flanks has been ground and a succeeding pair are to be worked upon.

The carriage 2 is reciprocated by a driving unit 8 which is combined with a rotary position transducer 8a, the unit having an output pinion 9 meshing with a toothed rack 10 of the carriage 2. In this way are obtained axial displacements of the workpiece. The cross-carriage 3 is reciprocated, to produce the generating motion of the workpiece 4, by means of a driving unit 11 via a crank 12 engaging a sliding block 13 located in a guide 14 secured to the cross-carriage 3.

Two disc grinding wheels 15 and 16 are mounted on a grinding wheel support 17 which, for the sake of clarity, is shown only fragmentarily, said support being fixed relative to the bed 1. Each of the grinding wheels can be displaced in the direction of its axis of rotation. FIG. 1 shows the means for said displacement only for the grinding wheel 15, which grinds the left-hand tooth flanks, but corresponding means are disposed symmetrically thereto in the machine for the grinding wheel 16 which grinds the right-hand tooth flanks.

Each grinding wheel is mounted on its own shaft that terminates at the end remote from the wheel in a shaft collar 18 and a compression spring 19 between said collar and the shaft bearing in the grinding wheel support urges each grinding wheel towards an axial end position. Acting in the opposite direction to said spring, and thus defining the axial position of the grinding wheel is a roller 20 supported on a lever 21 which in turn is journalled on a pivot 22 fixedly connected to the grinding wheel support 17. At its end remote from the roller 20, the lever 21 is provided with a further roller 23 which engages a disc cam 24 rotatable by a stepping motor 25 which thus controls the axial position of the grinding wheel 15. A stepping motor 26 is provided for correspondingly controlling the position of the grinding wheel 16. In each instance the compression spring 19 provides the force that maintains the follower roller 23 in contact with the disc cam 24.

The rotary position transducer 8a which is combined with the carriage driving unit defines the position of the carriage 2 and therefore also defines the axial position of the workpiece 4 with respect to the grinding wheels 15 and 16. A further rotary position transducer 27 is associated with the driving unit 11 to be responsive to the generating motion whereby it monitors the displacement of the generating cross-carriage 3 and also the instantaneous generating position of the tooth flanks of the workpiece 4 with respect to the grinding wheels 15 and 16. Rotary position transducers 28 and 29 are associated with the respective stepping motors 25 and 26 to function as position monitoring means for the grinding wheel feed. Stepping motors 25 and 26 as well as the rotary position transducers 8, 27, 28 and 29 are electrically connected to an electronic store and control unit 30.

The store and control unit comprises an input unit 31 with a keyboard 32 for feeding in the data through an electronic operating store 33. A central computer unit 34 and an interpolator 35 are connected to the said operating store. The said interpolator is followed by an output stage 36. The unit 30 also includes display devices 37, 38 and 39 for $x$ and $y$ and $z$ co-ordinates, and a program selector switch 40.

Figure 3:
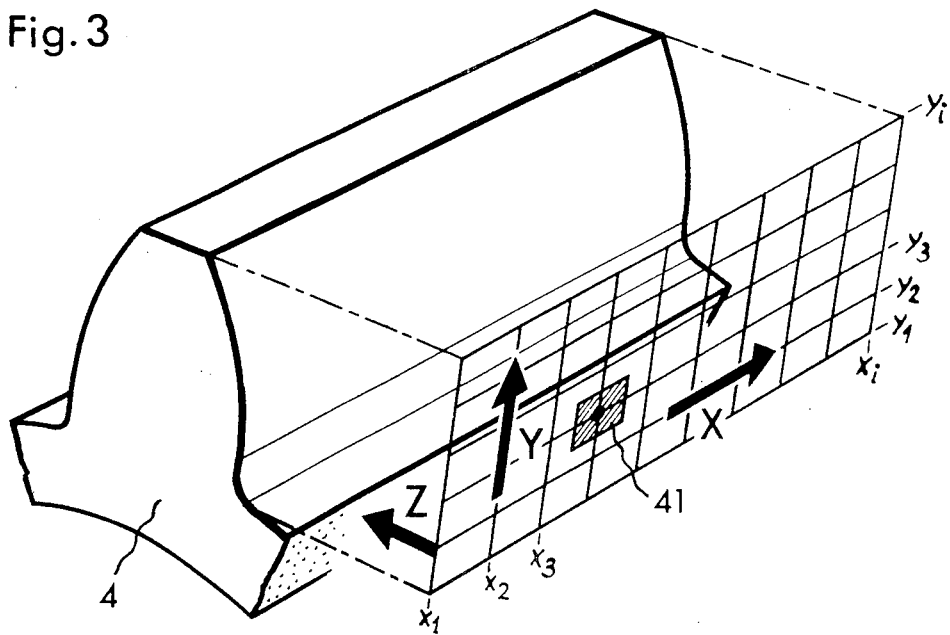
FIG. 3 shows a gear tooth with involute flanks and an x-y system of co-ordinates for said flanks, the z axis representing the direction of grinding wheel feed.

In order to enable each zone of the tooth flanks of the workpiece 4 to be acted upon individually, the tooth flank area is associated with a two-dimensional system of $x$, $y$ co-ordinates (FIG. 3) which divides it into a plurality of zones 41. Each zone is characterised by a pair of values $x_i$, $y_i$ which is associated with a given wheel feed position. Preferably, unit increments along the $y$ axis are not uniform with respect to tooth height or radial position but are instead in a linear relationship to the involute generating displacement.

To grind tooth flanks with any desired deviations from the theoretical involute form the wheel feed values, which correspond to movements in the direction of the $z$ axis, are previously fed into the store and control unit by way of the input unit 31 or of the keyboard 32. During the grinding operation the feed values are interrogated in the store for instantaneous relative positions between each tooth flank and wheel as the grinding wheels 15 and 16 traverse over the tooth flanks in any desired direction. In each zone 41 the appropriate feed value is transferred from the store 33 into the central computer unit 34 where the value is compared with the indicated setting of the associated stepping motor 25 or 26 and is then supplied to the interpolator. Differences revealed in this comparison give correcting feed values that are supplied via the output stage 36 to the associated stepping motor to rotate its disc cam 24 and thus cause the lever 21 to be pivoted by the roller 23 and axially displace the grinding wheel 15 or 16 by the movement of the roller 20 and the shaft collar 18, so producing a feed along the $a$ axis of the system of co-ordinates. This feed corresponds to the correction value for the zone concerned, which has been defined by the rotary transducer 8a for the tooth longitudinal direction ($x$ direction) and by the rotary transducer 27 for the tooth height direction as a linear function of the generating motion of the workpiece ($y$ direction).

Figure 4:
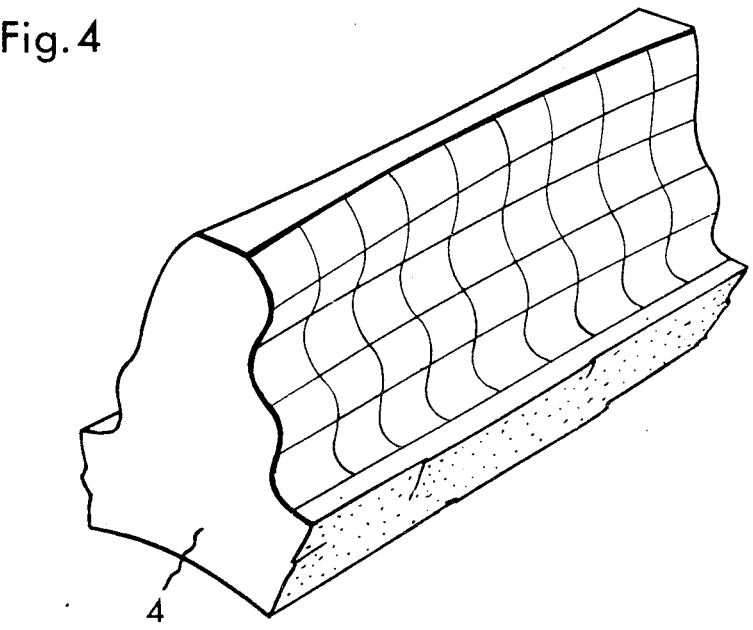
FIG. 4 shows the same gear tooth but with the tooth profile varying also along the tooth length, the variations being shown in a greatly exaggerated form.

FIG. 4 shows a random tooth flank correction in greatly exaggerated form in which the tooth profile varies continuously along the tooth due to the above-described grinding wheel feed control in the $z$ direction. In order to obtain a tooth flank which is as smooth as possible and without any steps resulting from a sudden change of the feed rate the correcting displacements in the $z$ direction should be transmitted to the stepping motors in steps which are as small as possible but very numerous. This is obtained by linear interpolation of an individual co-ordinate step as a difference of, for example, $x_2y_3$ to $x_2y_4$ and/or $x_2y_3$ to $x_3y_3$, by means of the interpolator 35, the amount of feed being divided into a plurality of equal increments which are transmitted in series to the feed system.

It is basically possible to perform the correcting displacements in the $z$ direction as a supplementary motion of the workpiece 4 instead of the axial motions of the grinding wheels 15 and 16 which are adjusted independently of each other. However, this only applies if one tooth flank is machined at a time and not when both tooth flanks are simultaneously ground as is generally the practice in the zero degrees grinding method.

The keyboard 32 has been shown as one specific form of input for the store and control unit. Clearly other known devices can be employed, e.g. a punched tape reader may be preferred for mass production or for identical grinding operations which are constantly repeated.

It is also possible to use known longitudinal correction templates in the $x$ direction in place of the electronic control, that is to say in the longitudinal direction of the gear teeth, and to employ the above-described method and apparatus in the tooth height direction, that is to say in the $y$ direction. Since such template control of relative feed positions is already fully described in U.S. Pat. No. 3,044,221 previously referred to above, further particularisation is not required here for a full understanding of how this is achieved.

What I claim and desire to secure by Letters Patent is:

1. A method of grinding at least one gear tooth flank on a workpiece by means of at least one grinding wheel comprising: applying a generating motion between the workpiece and said wheel to give said gear tooth flank an involute profile, varying said motion by the superimposition of relative feed displacements between said workpiece and wheel in a direction transverse to the flank of a gear tooth being ground, to modify said profile, said variation being obtained by relating the area of said flank to a system of co-ordinates, storing a program in terms of said co-ordinates for relative feed positions between said workpiece and wheel giving said modified profile and, interrogating the instantaneous relative position to said grinding wheel and the workpiece at predetermined points in the travel of the wheel relative to the tooth flank, comparing the measured and programmed position values, and employing the results of the comparison to apply said superimposed displacements at said points for said modification of the gear tooth involute profile.

2. A method according to claim 1 including employing the programmed positions at successive interrogation points to provide interpolated modifying feed modification intermediate said points.

3. A method according to claim 1 including the steps of providing template feed control means and employing said template means for control of said relative feed positions in the longitudinal direction of a gear tooth while using said stored program for relative feed motions for modification of the tooth profile in the direction of the height of the gear tooth.

* * * * *